Nov. 24, 1936.  J. DE LUCA  2,061,793
SAFETY DEVICE FOR MOTION PICTURE PROJECTORS
Filed Sept. 17, 1934  4 Sheets-Sheet 1
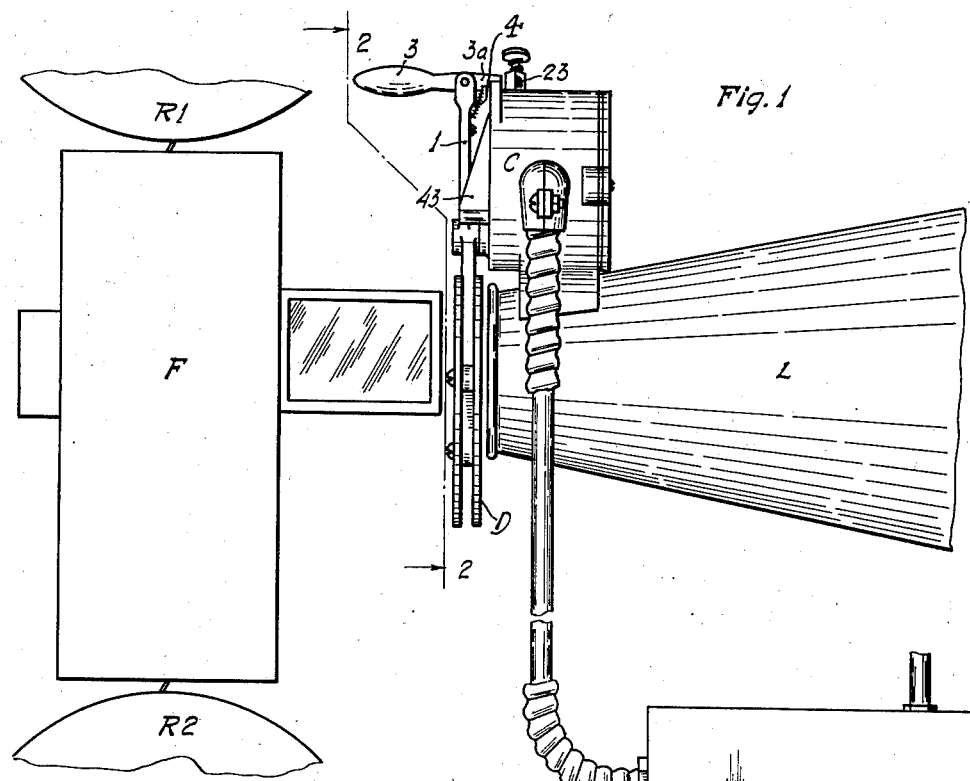
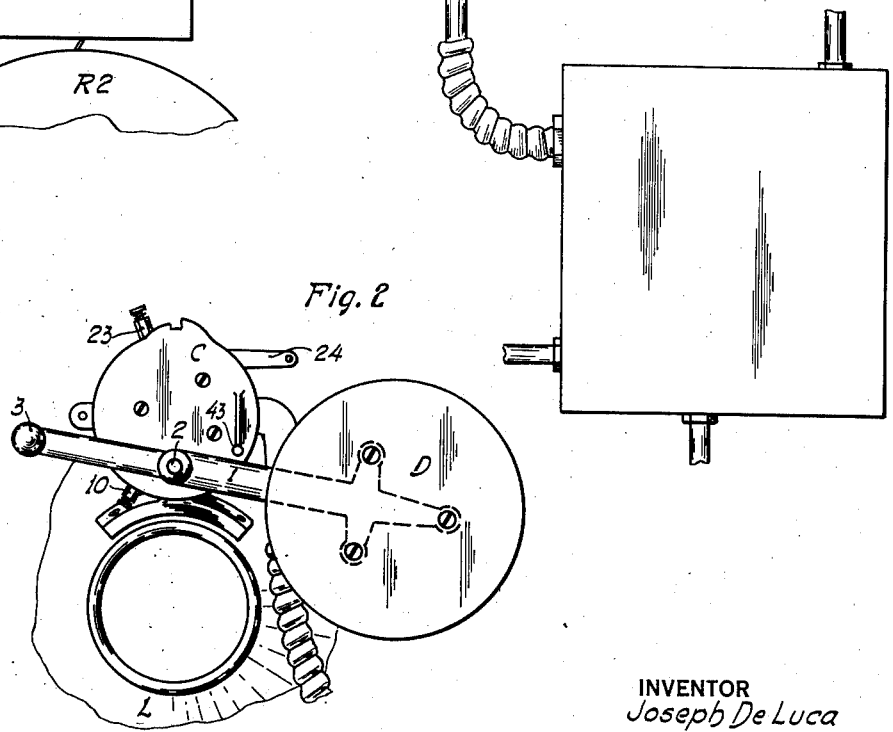
INVENTOR
Joseph De Luca
BY
ATTORNEY Nov. 24, 1936.  J. DE LUCA  2,061,793
SAFETY DEVICE FOR MOTION PICTURE PROJECTORS
Filed Sept. 17, 1934  4 Sheets-Sheet 2

INVENTOR
Joseph De Luca
BY Harry Sangsam
ATTORNEY

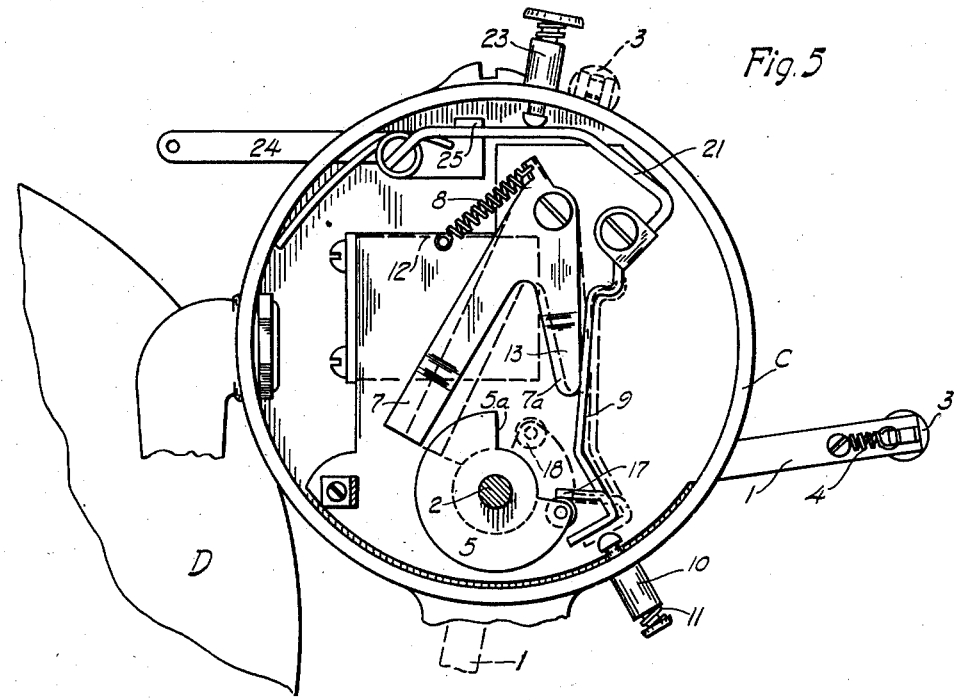
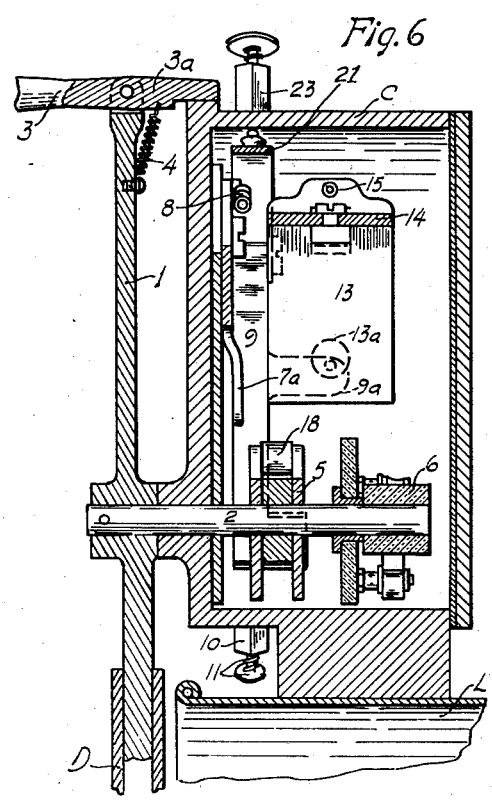
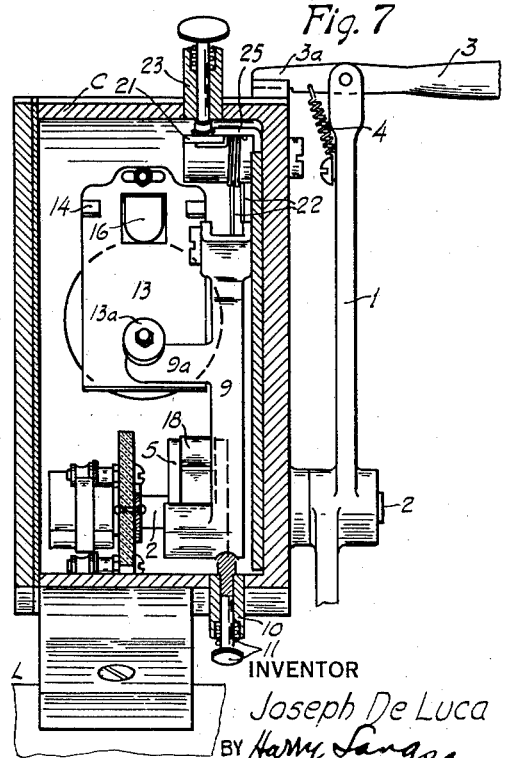

Nov. 24, 1936.                J. DE LUCA                2,061,793
            SAFETY DEVICE FOR MOTION PICTURE PROJECTORS
                    Filed Sept. 17, 1934        4 Sheets-Sheet 4

INVENTOR
Joseph De Luca.
BY Harry Langoam
    ATTORNEY

Patented Nov. 24, 1936

2,061,793

UNITED STATES PATENT OFFICE 2,061,793

SAFETY DEVICE FOR MOTION PICTURE PROJECTORS

Joseph De Luca, Philadelphia, Pa., assignor to Sentry Safety Control Corporation, Philadelphia, Pa., a corporation of Delaware Application September 17, 1934, Serial No. 744,395

4 Claims. (Cl. 88—17)

This invention relates to devices which are utilized in connection with motion picture projection apparatus for the protection apparatus of the film.

In motion picture projecting machines it is customary to mount a disc between the lamphouse and the film-driving mechanism for manually controlled pivotal movement into or out of the path of the projected beam of light. This disc is known as the "dowser" and is used for such purposes as "fading in" a film upon the screen and/or preventing the projected beam of light from striking the film when the latter is stationary or traveling under a certain "minimum" rate of speed. It has been proposed, however, to provide an automatic safety device for controlling the operation of the dowser and it is to an improvement in such device that the present invention is directed.

The safety device referred to is electrically controlled and arranged to be rendered electrically operative at the same time that the film driving mechanism is started. While the driving mechanism is running, the safety device automatically functions to (1) permit the dowser to be moved manually out of the path of the projected beam of light when, and only when, the film is traveling above the "minimum" rate of speed, (2) hold the dowser out of the path after it has been so moved and until it is either manually or automatically released and (3) release the dowser either when the speed of the film falls below the "minimum" speed or when the film is torn. When the safety device is "off"—as it will be when the driving mechanism is idle or when the current controlling the device is turned "off"—the arrangement of the safety device is such as to (4) permit the dowser to be moved manually out of the path of the projected beam of light when, and only when, a latch-releasing button is manually operated but it will not function to (5) hold the dowser out of the path. It follows, therefore, that when the safety device falls to "off" position, the operator knows that some portion of the machine has failed. The dowser will not be able to be moved from its light obstructing position by the operator until the film is traveling at the minimum speed to prevent ignition of the film, or the film is not broken or clogged, or the motor transmission belt is not broken, or a fuse has not blown in the motor circuit. If the various instrumentalities are functioning normally, then automatic means will permit the dowser to be moved by the operator. However, if but one part is not functioning normally, then the automatic devices will not permit the operator to move the dowser. Thus, the attention of the operator is directed to the fact that some portion of the machine is in inoperative condition and should be repaired or reset. Finally, if the safety device will not, for some reason, work automatically during the projection of a film, the operator must hold the dowser up manually preventing him from tending to his other duties. In such case, it is generally necessary to tie the dowser in the up position. This, however, introduces a very serious fire hazard—inasmuch as a drop below the "minimum" speed of the film driving mechanism may cause the film to ignite before the operator can release the dowser—which the safety device is primarily designed to prevent.

Embodiments of a safety device construction in which the invention is incorporated, is illustrated in the accompanying drawings, wherein:

Figure 1 is a schematic side elevational view showing the arrangement of the safety device employing my invention with respect to the lamp house and the film driving mechanism.

Figure 2 is a front elevational view of the safety device with the rear cover plate removed.

Figure 5 is a view similar to that shown in Figure 4 except that the dowser is positioned to uncover the apertured end of the lamp house, the position of the parts corresponding to the initial movement of the dowser being shown in dotted lines.

Figure 6 is a section along line 6—6 of Figure 3.

Figure 7 is a section along a line corresponding to line 7—7 of Figure 4.

Figure 8:
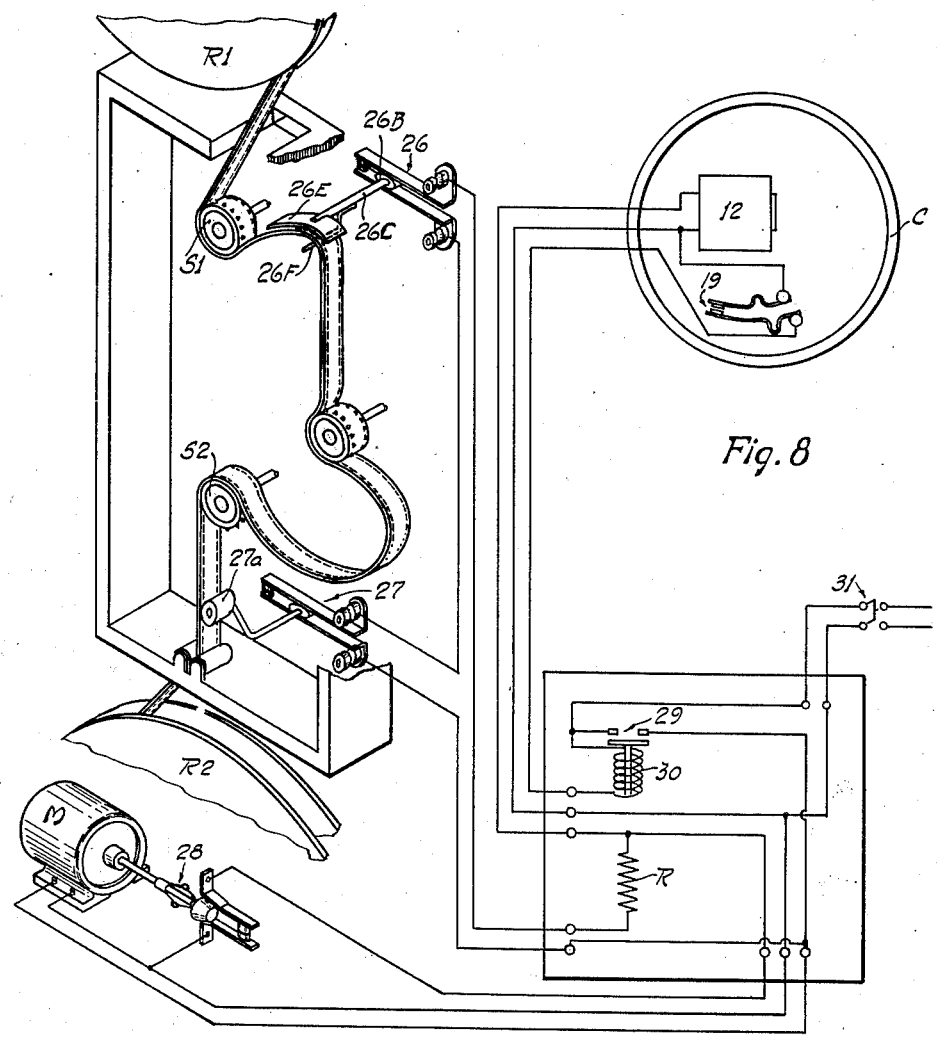
Figure 8 is a schematic view showing the circuit arrangement of the device in relation to the various switches and the film.

The safety device may be applied to any suitable type of projecting apparatus and is shown in Figures 1 and 8 in connection with the lamphouse and the film driving mechanism, these parts being indicated generally as L and F respectively. During the operation of the projector, the film passes from the upper reel R1 around the upper sprocket S1 and thence over a shutter-controlled aperture and around the lower sprocket S2 to the lower reel R2, while the lamp-house L is arranged to project a beam of light through the shutter controlled aperture, and hence through the film, to the screen.

The dowser D is, as previously stated, arranged for pivotal movement into and out of the path of the beam of light projected from the lamp-house L. To this end the dowser D is mounted on one end of a cross arm 1 which is secured, intermediate its ends, to an angularly movable shaft 2 extending transversely into the safety device. The latter is indicated in Figures 1 and 2 by a showing of its casing C and, as shown, is mounted on the lamp-house L in such manner as to permit the dowser D to swing at right angles to the path of light between limits sufficient to cover or uncover the apertured end of the lamp-house L, these limits being hereinafter termed the down and up positions respectively of the dowser. The cross arm 1, at the end opposite the dowser, is provided with a handle 3 by which the dowser may be manually moved. The handle 3 is pivotally secured to the cross arm and is provided with an extension 3a which fits into a groove formed in the casing C to latch the dowser in the down position. The extension 3a is releasably held in the groove by a spring 4.

The dowser shaft 2 carries on its inner end, a pair of spaced cam plates 5 and a cylindrical block 6, the latter being composed of insulating material. The spaced cam plates 5 have a segment removed to provide a radially extending surface 5a which is engaged by an arm 7 when the dowser is moved a slight distance toward the up position. The arm 7 is pivotally mounted on the casing C and normally is held in the path of movement of the cam surface 5a by a spring 8. The arm 7 thus functions to permit the dowser to be moved a slight distance toward the up position but prevents a movement sufficient to uncover the apertured end of the lamp-house L.

Figure 4:
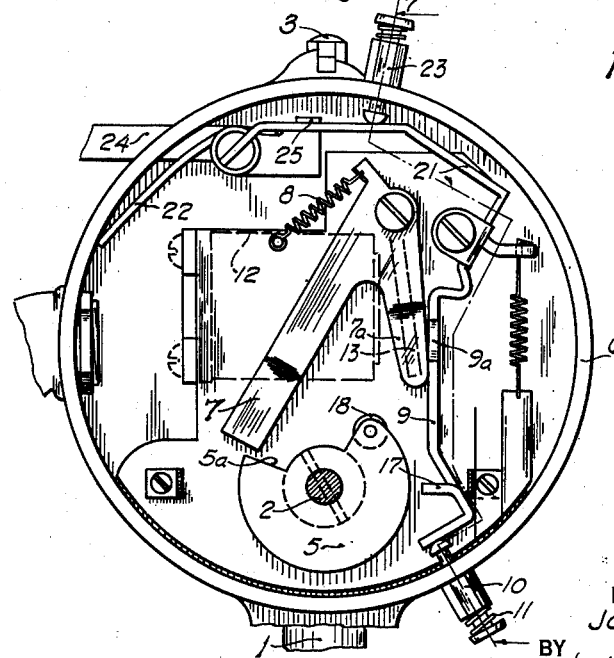
Figure 4 is a view similar to that shown in Figure 3, parts of the device being omitted to illustrate the construction more clearly. In this view, like that of Figure 3, the dowser is positioned to cover the apertured end of the lamp house.

In order to move the arm 7 out of the path of movement of the cam surface 5a, and thereby permit the dowser to be moved to the up position so as to uncover the lamp-house aperture, the arm 7 is formed with an auxiliary arm 7a. The free end of the auxiliary arm 7a, as shown in Figures 4 and 5, normally is held by the spring 8 in abutting relation with an arm 9 which also is pivotally mounted on the casing C. It is evident that a movement of the arm 9 from its normal position will force the auxiliary arm 7a about its pivot with resultant movement of the arm 7 out of the path of the cam surface 5a. When this is done, the dowser can be moved to the up position.

The movement of the trigger or arm 9 is controlled both manually and automatically. The manual movement of the arm is controlled by a plunger 10 which extends through the casing C. The plunger is urged outwardly from the casing by a spring 11, the inner end of the plunger being enlarged to prevent complete withdrawal. This enlarged end abuts the free end of the arm 9, the latter being turned or bent over in such manner that when the plunger 10 is pressed inwardly, the arm 9 is forced to swing from its normal position toward the cam plates a distance sufficient to move the arm 7 out of the path of the radial surface of the cam plates thereby permitting the manual movement of the dowser to the up position.

The automatic movement of the arm 9 is controlled through the coil 12 and the armature 13, the latter forming a part of the magnetic circuit of the coil 12 being the connecting link between one end of the yoke 14 and the core of the coil. This armature is mounted on the yoke for pivotal movement toward or away from one end of the coil 12 but is normally held away by a spring 15, the position being determined by a stop 16. The armature 13 is connected to the arm 9 by a U-shaped member 13a which is secured to the armature and arranged to straddle a projection 9a extending from the arm 9. Thus it will be seen that an initial movement of the armature 13 will, through the agency of U-shaped member 13a, projection 9a and arm 9, move the arm 7 out of the path of the cam plates 5 thereby permitting the dowser to be moved to the up position. The movement of the armature 13 is, of course, controlled by the coil 12 and in order to prevent the armature 13 from initially moving up against the core of the coil, the arm 9 is provided with a tang 17 which engages the peripheral surface of the cam plates after the arm 9 has moved sufficiently to bring the arm 7 out of the path of the cam plates. The movement of the armature 13 is thus limited until the dowser reaches the up position at which point the armature is free to complete its movement toward the coil inasmuch as the cam plates have been rotated to the point where their cut away segment is brought opposite to the tang 17. This full or final movement of the armature 13 causes a further movement of the arm 9 thus moving the tang 17 into the cut away segment to a position where it overlies and engages a roller 18 extending between and carried by the cam plates thereby latching the dowser in the up position.

It will be readily appreciated that the dowser will remain in the up position as long as the coil 12 remains energized. Should anything occur to deenergize the coil, the armature 13 will be returned immediately to its normal position by the spring 15 with resultant movement of the tang 17 from the latching position thereby permitting the dowser to drop to the down position.

The coil 12 is controlled by a circuit arrangement involving a switch within the casing C of the device. This switch is indicated by the numeral 19, and is operated by the cylindrical block 6 on the shaft 2. A second switch is indicated as 31. A contact of switch 19 is provided with a bent portion which, when the dowser is in the down position, fits into a groove formed in the block 6, the arrangement being such as to close the switch at the point where the cam plates stroke the arm 7 and to hold it closed during all movements beyond this point.

Figure 3:
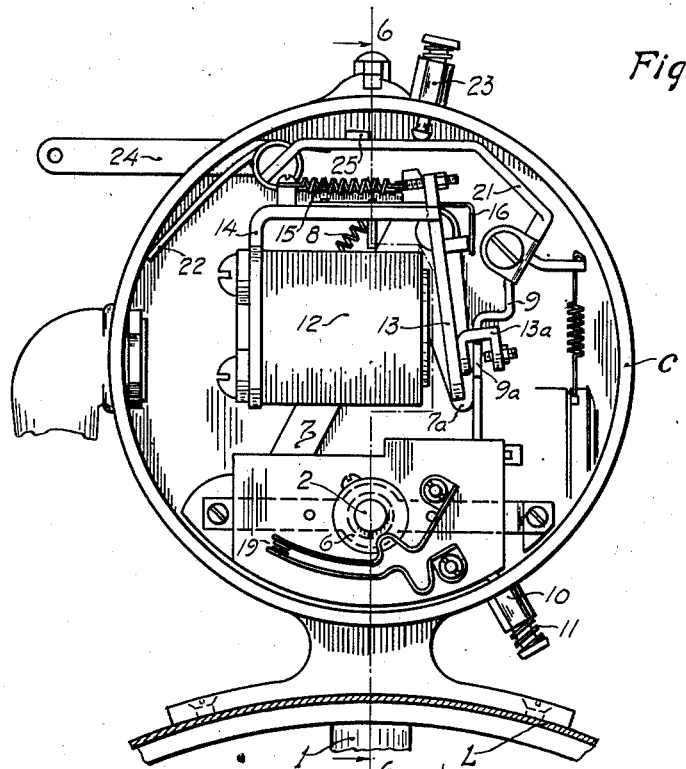
Figure 3 is a side elevational view of the safety device with the rear cover plate removed.

The dowser may also be placed in "down" position by manually actuating a spring pressed plunger 23 which extends through the casing C with its inner end abutting the arm 21. The contact arm 21 is rigidly connected with the arm 9, see Figs. 3 and 4, so that down movement of the plunger rotates the arm 21 as well as the arm 9 in a counterclockwise direction, as viewed in Fig. 3, thus moving the tang 17 from in engagement with the roller 18, thereby permitting the shaft 2 and the dowser D to rotate.

The arm 21 may also be rotated to place the dowser in a "down" position by a pivotally mounted lever 24 which extends through the wall of the casing C. The lever 24 is pivotally mounted and is connected to the arm through a lug 25 which overlies the arm 21. A spring is connected to the arm 9 to bias that arm in position.

The circuit arrangement which is shown in Figure 8 also includes a switch 26 adjacent the upper sprocket S1, a switch 27 adjacent the lower sprocket S2, a speed or centrifugal switch 28 connected to the driving motor M, and a line contactor 29 with its operating coil 30 which may be conveniently located in a suitably mounted control box.

The upper sprocket switch 26 is operated by a loosely mounted member 26a, which is arranged adjacent a loop in the film, the arrangement being such that when the film buckles or becomes torn, it moves the member thereby opening the switch contacts. Positioned between the two contact members of the switch, generally designated as 26, is a cam member 26B. The cam member when in normal position permits the circuit through the switch to be closed, but when in abnormal condition, as shall hereinafter be described, separates the contacts. The cam 26B is mounted upon one end of a shaft 26C and the shaft at its other end has two separated arms 26E and 26F attached thereto. The arm 26E is a curved plate extending over the path of the film and the arm 26F is beneath the film. The arm functions in the following manner: if the film should be fed over the sprocket roller 31 too rapidly so that it piles up, the film will move arm 26E upwardly thereby rotating the shaft 26C and so separating the switch contacts to open the circuit. Should the loop of the film from the sprocket roller S1 be decreased, the film pulls upon the lower arm 26F thereby rotating the shaft 26C, the cam 26B and so separating the contact members of the switch 26.

The lower sprocket switch 27 is operated by a member 27a which is held in its proper position by the film, this member riding loosely against the film. When the film breaks, buckles or otherwise moves from its proper position, it causes the operating member to move thereby opening the contacts.

The speed switch 28 utilized may be any suitable arrangement for opening a pair of contacts when the speed of the film rises above a certain value and for closing the contacts when the film speed drops below such value. As shown this switch is operated directly from the driving motor M but it may, of course, be otherwise operated.

In the circuit arrangement, the motor M is arranged in series with the line contactor 29 and connected directly across the power line. The operating coil 30 of contactor 29 is arranged in series with the switch 19 of the safety device and connected directly across the power line. The coil 12 of the safety device is arranged in parallel with the speed switch 28, this switch functioning, when closed, to shortcircuit the coil. This ensemble is arranged in series with a current limiting resistor R, the upper and lower sprocket switches 26 and 27 and the line contactor 29 and connected directly across the line. The power line is controlled by the switch 31.

When the film is arranged in the projector the power switch 31 closed, and the dowser in the down position, the light projected from the lamp-house is cut off and the screen dark. When the dowser is moved to the point where the radial surface of the cam plates 5 strike the arm 7, the cylindrical block 6 operates the switch 19 in the safety device thereby closing the circuit of the line contactor coil 30. This coil operates the line contactor 29 closing the circuit of the motor M. When the motor speed rises above the value at which the speed switch 28 is set, this switch is operated to open its contacts thereby removing the short circuit around the coil 12. The coil 12 is thus energized and pulls the armature 13 over until the tang 17 strokes the peripheral surface of the cam plates 5 which movement is sufficient to move the arm 7 out of the path of the radial surface of the cam plates permitting the dowser D to be moved to the up position. When the dowser reaches the up position, the coil 12 pulls the armature 13 over against the core of the coil which brings the tang 17 into latching position thus automatically holding the dowser in the up position.

The dowser, as previously stated, will remain in the up position so long as the coil 12 remains energized. The coil will, however, be deenergized when (1) the upper sprocket switch 26 is opened by the buckling or tearing of the film, or (2) the lower sprocket switch 27 is opened by the buckling or breaking of the film, or (3) the coil short circuiting speed switch 28 is closed by a drop in speed below the set value. As soon as the dowser drops, the switch 19 in the safety device is opened thereby opening the circuit of the line contactor coil 30 which in turn opens the circuit of the motor at the line contactor 29 thus completely shutting down the projector.

The positions at which the dowser cuts the beam of light on and off are respectively termed up and down positions. It will, of course, be understood that such terms are utilized for the sake of brevity and not intended as a limitation of the claims.

Having fully described my invention, I claim:

1. A dowser control mechanism for a motion picture projecting machine comprising a shaft, a dowser mounted upon said shaft, a plurality of cam plates mounted upon said shaft, a notch in the periphery of each plate, said plates in alinement so that the notches coincide, radially extending edges defining a portion of the notch, a roller connected between said plates adjacent one of the radially extending edges, a roller also located upon said shaft and having a notch therein, a plurality of flexible contacts located adjacent said notched roller, one of said contacts having an extension to engage into said notch of the roller whereby the contacts will be opened when said extension and notch are interfitting.

2. In safety mechanism for a motion picture projecting machine comprising a casing, a rotatable shaft pivotally mounted on said casing, a dowser mounted upon said shaft, a member (9) pivotally mounted intermediate its ends on said casing, said shaft carrying a plurality of aligned peripheral notched cam plates, a cylindrical member interposed between said cam plates and being located adjacent one of the edges defining the notch, said member including a pair of spaced arms at one end thereof, whereby the cylindrical member may be disposed therebetween when said dowser is in its extreme position of light unobstructing position, an electromagnet and a complementary movable armature (13) movable by said electromagnet, spaced arms on said armature being adapted to engage said member and holding said member whereby the cylindrical member is disposed between the spaced arms to hold the dowser in light unobstructing position, the release of the armature resulting in the dropping of the dowser to light obstructing position.

3. In a safety device for a motion picture projecting machine comprising a casing, a rotatable shaft pivotally mounted on said casing, a dowser plate mounted exteriorly upon said shaft, a trigger pivotally mounted intermediate its ends within said casing, a fork-like member on one end of said trigger, an electro-magnet and a complementary pivoted armature movable by said electro-magnet, a pair of spaced arms mounted upon said armature and having the trigger placed between said spaced arms whereby the trigger is oscillated by said spaced arms, a plurality of aligned peripheral notched cam plates carried by said shaft, a cylindrical-like member interposed between said cam plates and being located adjacent one of the edges defining the notch, said cylindrical-like member being adapted to interfit with the fork-like member on the trigger to hold the dowser in light unobstructing position when the electromagnet is energized or the armature is moved to a position equivalent to the position the armature would assume when the electromagnet is energized, and a pivoted member having a short arm adapted to be engaged by said trigger and a longer arm adapted to engage an edge defining the notch, said longer arm preventing direct movement of the dowser when the dowser is in light obstructing position, and being movable to unobstruct the movement of the dowser when the armature is in the position as when the electromagnet is energized.

4. The invention as in claim 3 including a notched member on said shaft, a switch within said casing, said switch including a flexible arm carrying a contact member, said flexible arm being bent to have a ridge therein which interfits with the notch of said notched member whereby the circuit through the switch will be opened.

JOSEPH DE LUCA.